(No Model.)
C. BOUCHARD.
KITCHEN CABINET.
No. 514,540. Patented Feb. 13, 1894.
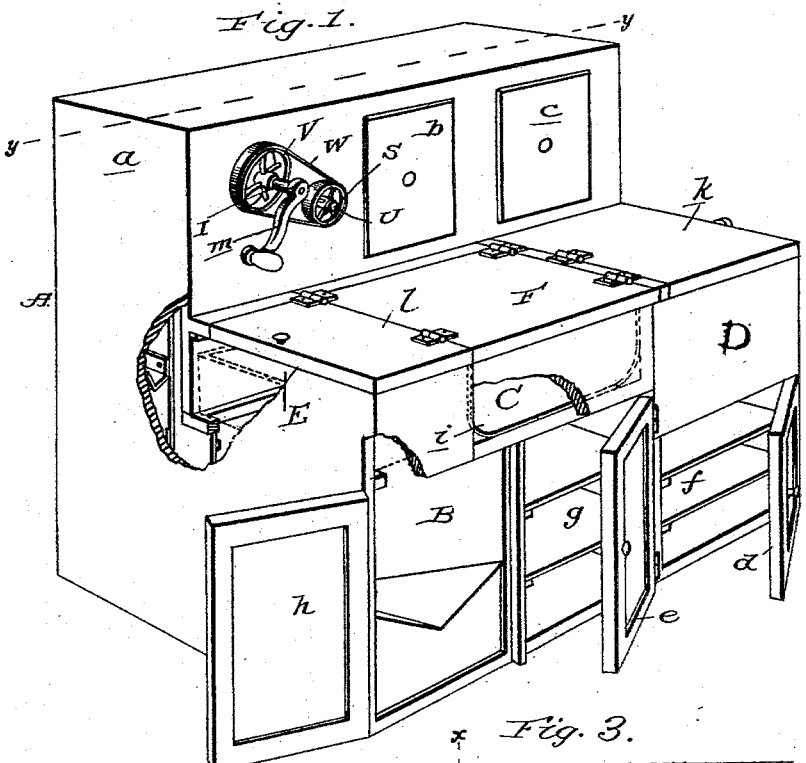
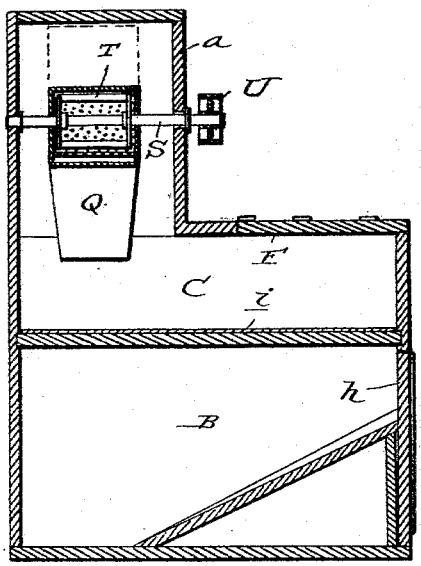
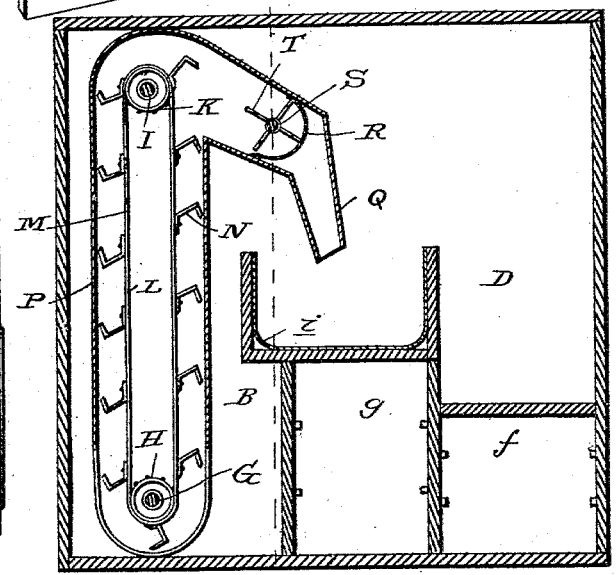
Witnesses:
C. H. Raeder
K. F. Matthews.
Inventor
Charles Bouchard
By James J. Sheehy
Attorney

UNITED STATES PATENT OFFICE.

CHARLES BOUCHARD, OF CHICAGO, ILLINOIS.

KITCHEN-CABINET.

SPECIFICATION forming part of Letters Patent No. 514,540, dated February 13, 1894.

Application filed April 17, 1893. Serial No. 470,673. (No model.)

*To all whom it may concern:*

Be it known that I, CHARLES BOUCHARD, a citizen of the United States, residing at Chicago, in the county of Cook and State of Illinois, have invented certain new and useful Improvements in Kitchen-Cabinets; and I do declare the following to be a full, clear, and exact description of the invention, such as will enable others skilled in the art to which it appertains to make and use the same.

This invention has relation to an improvement in kitchen cabinets, and it has for its object to provide such a cabinet with a kneading chamber or receptacle, a flour receptacle, and a combined elevator and sifter, so arranged that the flour may be raised and discharged into the dough or kneading receptacle in a clean condition; to provide a convenient means for holding a small quantity of flour for handy use, and to provide other chambers and drawers for holding pies, spices, and such implements as are commonly used in kitchens, in connection with a baking outfit.

Other objects and advantages will appear from the following description and claim when taken in connection with the accompanying drawings, in which—

Figure 1, is a perspective view of my improved cabinet with parts broken away. Fig. 2, is a vertical sectional view taken in the plane indicated by the dotted line $x$, $x$, on Fig. 3, and Fig. 3, is a vertical sectional view taken at right angles to Fig. 2, and in the plane indicated by the dotted line $y$, $y$, on Fig. 1.

Referring by letter to said drawings:—A, indicates the cabinet, which may be made of wood, and ornamented according to the taste or fancy of the mechanic. This cabinet has its rear portion elevated above its front, as shown at $a$, and this elevated portion may be provided at or near one end with drawers $b$, and $c$, or other means for conveniently holding spices, or such implements as are used in baking.

B, indicates a flour receptacle. This receptacle may have a hopper shaped body so as to allow the flour to fall to the center, for a purpose which will be presently described. The front lower portion of the cabinet is provided with doors $d$, and $e$, for closing receptacles $f$, and $g$, in which slides are arranged upon suitable ledges for holding pies, or other articles, and the flour chamber is also provided with a door $h$, through which access may be had.

C, indicates a dough or kneading chamber. This chamber is arranged in the upper central portion of the cabinet, and extends from front to rear thereof, and is lined with sheet metal $i$, or other suitable material, as shown. Arranged upon one side of the kneading chamber, is a chamber D, which may be used for holding bread, and this chamber is provided with a hinged cover $k$. On the opposite side of the kneading chamber, is a smaller chamber E, which is designed to receive a removable receptacle such as a pan for holding a small quantity of flour for immediate use, and this chamber is also provided with a hinged cover $l$. The exposed top of the kneading chamber is provided with a hinged cover F, which is designed to serve the additional function of a kneading board, and when used for this purpose it is turned over upon the cover $k$, so that the kneading may be done upon its under side which is always kept in a clean condition.

Journaled transversely in the lower portion $a$, of the cabinet, is a shaft G, which is provided with a sprocket wheel H, fixed thereto, and journaled directly above this lower shaft, and in the upper part of the cabinet, is a similar shaft I, carrying a sprocket wheel K.

L, indicates an elevator. This elevator comprises an endless belt M, having angular blades or buckets N, secured to the belt, as shown, and the belt is arranged over the sprockets on the shaft so that when in operation, its buckets or elevating blades will dip into the flour at the bottom of the receptacle, and elevate the same to the top of the cabinet. This elevator may be inclosed by a case P, from which extends a nozzle Q, arranged over one end of the kneading chamber so that the flour or meal as it is elevated, will be discharged into the kneading chamber. Within the discharge nozzle is arranged a sieve through which the flour or meal must pass as it is discharged from the elevator and before it is deposited onto the kneading board. This sieve is here shown as comprising a gauze or perforated sheet R, arranged transversely within the nozzle, and a shaft S, journaled in said nozzle, and provided with beaters or blades T. On one end of the shaft S, is a belt wheel or pulley U, and a wheel or pulley V, is fixed to the shaft I, on the other side of the cabinet, and these two wheels or pulleys are connected by a drive belt W. The shaft I, is furthermore provided with a crank $m$, for turning the same. It will thus be seen that by turning the hand crank $m$, and rotating the shaft I, the elevator will be operated so as to raise the flour or meal into the sieve, and simultaneously with this operation, the sieve will be operated through the medium of the belt W, and the pulleys U, and V.

A device of this character will be found very convenient as the kneading board is always in a handy position, for use, and when it is desired to sift or place flour or meal in the kneading chamber, it is simply necessary to turn the hand crank.

To place flour or meal in the holder, the cover $l$, is first raised and the pan or receptacle therein removed, when the flour may be dumped down into the hopper bottom and in a convenient position for the action of the elevator.

I am aware that it is not new to provide a kitchen cabinet with an elevator for flour and meal, which elevator discharges into a sieve or sieves arranged above a kneading board, and I therefore do not claim such device broadly, but, Having described my invention, what I claim is—

The improved kitchen cabinet described, comprising the frame, having the rear, raised or elevated portion, with drawers $b$, and $c$, therein, the flour chamber B, having the endless elevator arranged vertically therein, the casing for the elevator, having a spout Q, the sieve R, arranged in said spout, and the beater also arranged in the spout above the sieve, and having a belt pulley on one end of its shaft, the belt pulley on the elevator shaft, the belt W, connecting both pulleys, the kneading chamber C, extending centrally from the front of the casing to the rear thereof, and beneath the discharge spout of the elevator frame, the chamber D, arranged on one side of the kneading chamber, the chamber E, arranged upon the opposite side and having the covers $k$, and $l$, the cover F, for the kneading chamber hinged to the covers $k$, and $l$, and adapted to serve the additional function of a kneading board when turned over upon the cover $k$, the receptacles $f$, and $g$, having doors and shelves, and the door $h$, for closing the chamber B, the whole being arranged to inclose the elevator and sifter and bring the discharge spout always over the kneading chamber, substantially as specified.

In testimony whereof I affix my signature in presence of two witnesses.

CHARLES BOUCHARD.

Witnesses:
FRANK. MOREE,
T. H. SPORLEDER.